United States Patent [19]
Lin

[11] Patent Number: 5,673,597
[45] Date of Patent: Oct. 7, 1997

[54] MOTORCYCLE REAR WHEEL BRAKE PEDAL

[76] Inventor: Frank Lin, 377, Chang Mei Road, Sec. 1, Changhua, Taiwan

[21] Appl. No.: 601,319

[22] Filed: Feb. 16, 1996

[51] Int. Cl.⁶ .................................................. G05G 1/14
[52] U.S. Cl. .................................. 74/563; 74/594.4
[58] Field of Search ........................... 24/594.4, 560, 24/561, 562, 562.5, 563, 564

[56] References Cited

U.S. PATENT DOCUMENTS

| | | | |
|---|---|---|---|
| 1,210,016 | 12/1916 | Sunden | 74/563 |
| 1,297,202 | 3/1919 | McGiehan | 74/563 |
| 3,065,649 | 11/1962 | Stringer | 74/560 |
| 5,398,570 | 3/1995 | Chae | 74/563 |

FOREIGN PATENT DOCUMENTS

| 3528351 | 2/1987 | Germany | 74/560 |
|---|---|---|---|

Primary Examiner—Charles A. Marmor
Assistant Examiner—Saúl J. Rodríguez
Attorney, Agent, or Firm—Beveridge, DeGrandi, Weilacher & Young LLP

[57] ABSTRACT

A motorcycle rear wheel brake pedal comprises a brake tread rod, a tread plate, a tread plate base, a fastening plate, and a fastening element. The brake tread rod is fastened at one end thereof with a motorcycle frame and is provided at another end thereof with a pedal seat on which the fastening plate is retained securely. The tread plate base is secured to the upper surface of the fastening plate and is provided on the upper surface thereof with a plurality of skidproof elongated ribs fastened thereto. The tread plate is provided with a plurality of elongated through holes corresponding in location, number and shape to the skidproof elongate ribs of the tread plate base. The tread plate is fastened to the tread plate base such that the skidproof elongate ribs of the tread plate base are received in and jutted out of the elongate through holes of the tread plate for providing the tread plate with a skidproof surface.

4 Claims, 4 Drawing Sheets 5,673,597

MOTORCYCLE REAR WHEEL BRAKE PEDAL

FIELD OF THE INVENTION

The present invention relates generally to a motorcycle, and more particularly to a rear wheel brake pedal of the motorcycle.

BACKGROUND OF THE INVENTION

As shown in FIG. 1, a motorcycle brake pedal A of the prior art is made integrally of a metal material and is mounted on a brake mounting base B of the motorcycle frame. Fastened with one end of the brake pedal A is a brake system C, which is located at one side of the bottom of the front side of the motorcycle frame. Fastened with another end of the brake pedal A is a read plate D which is provided on the upper surface thereof with a plurality of skidproof fine threads E to prevent the skidding of the foot sole of a motorcycle operator at such time when the tread plate D is pressed with the foot sole by the motorcycle operator so as to decelerate or stop the motorcycle on the move.

Such a prior art motorcycle brake pedal A as described above has inherent shortcomings, which are expounded explicitly hereinafter.

The fine threads E of the tread plate D of the prior art motorcycle brake pedal A are rather susceptible to wearing away by the constant treading actions of a shoe sole pressing the tread plate D. It is conceivable that there is little or no friction at all between the tread plate D having a smoothed upper surface and the shoe having a smooth sole, and that the braking action is dangerously undermined, especially on a raining day when the upper surface of the tread plate D is wet and when the motorcycle is operated on a bumpy road.

The prior art motorcycle brake pedal A is not economical in view of the fact that the brake pedal A is made integrally, and that the brake peal A must be therefore replaced in its entirety for replacing the smoothed tread plate D of the brake pedal A. In other words, a smoothed tread plate D can not be replaced independently of the brake pedal A.

SUMMARY OF THE INVENTION

The primary objective of the present invention is therefore to provide a motorcycle rear wheel brake pedal capable of overcoming the shortcomings of the prior art motorcycle brake pedal.

The motorcycle rear wheel brake pedal of the present invention comprises a brake tread rod, a tread plate, a tread plate base, a fastening plate and a fastening element. The brake tread rod is fastened securely at one end thereof with a motorcycle frame and is provided at another end thereof with a pedal seat on which the fastening plate is retained securely. The tread plate base is secured to the upper surface of the fastening plate and is provided on the upper surface thereof with a plurality of skidproof elongate ribs fastened thereto. The tread plate is provided with a plurality of elongate through holes corresponding in location and number to the skidproof elongate ribs of the tread plate base. The tread plate is fastened to the tread plate base such that the skidproof elongate ribs of the tread plate base are received in and jutted out of the elongate through holes of the tread plate for providing the tread plate with a skidproof surface.

The foregoing features, structures, functions and advantages of the present invention will be more readily understood upon a thoughtful deliberation of the following detailed description of embodiments of the present invention in conjunction with the accompanying drawings.

DETAILED DESCRIPTION OF THE EMBODIMENTS

Figure 1:
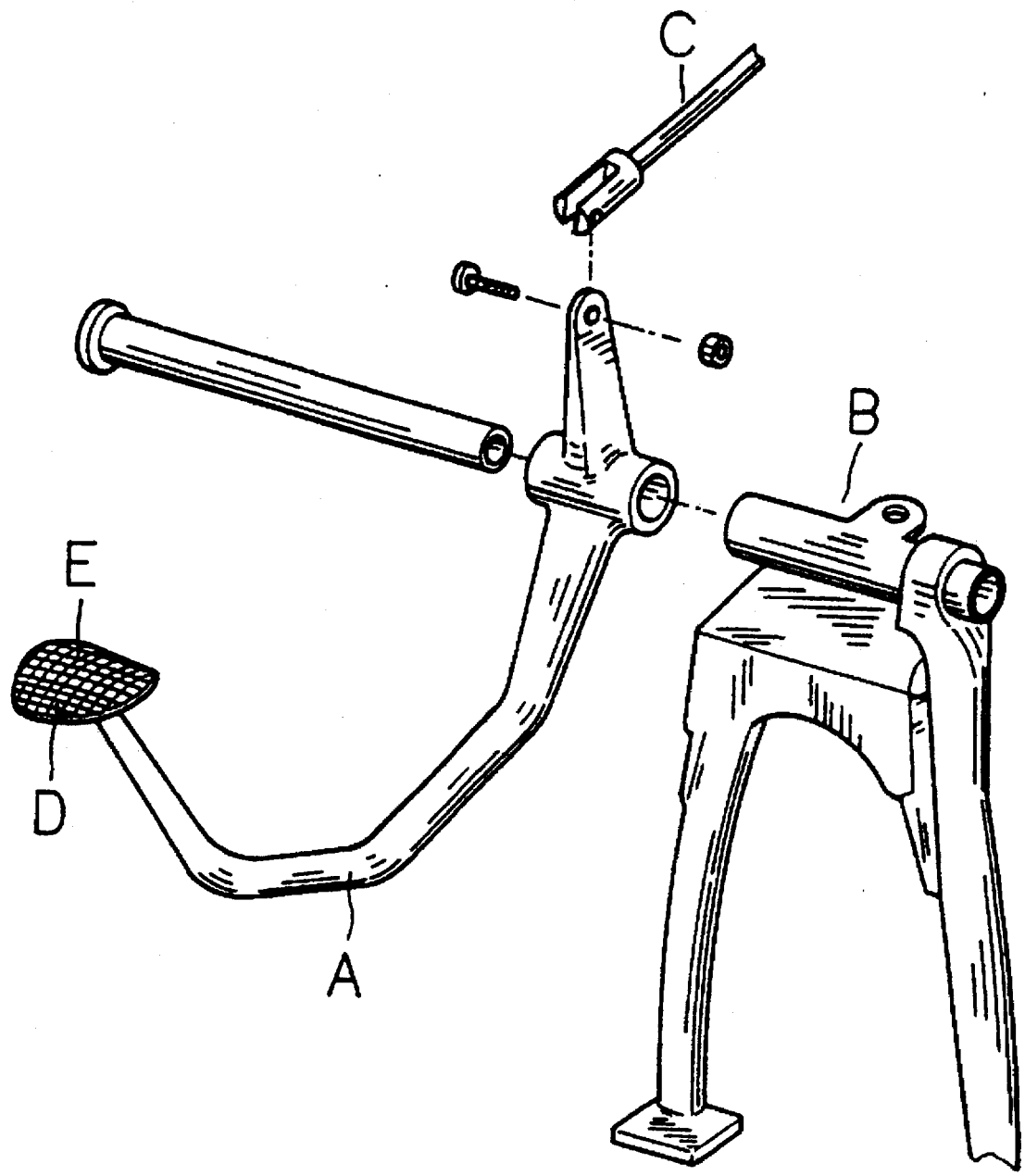
FIG. 1 shows a perspective schematic view of a motorcycle brake pedal of the prior art.
Figure 2:
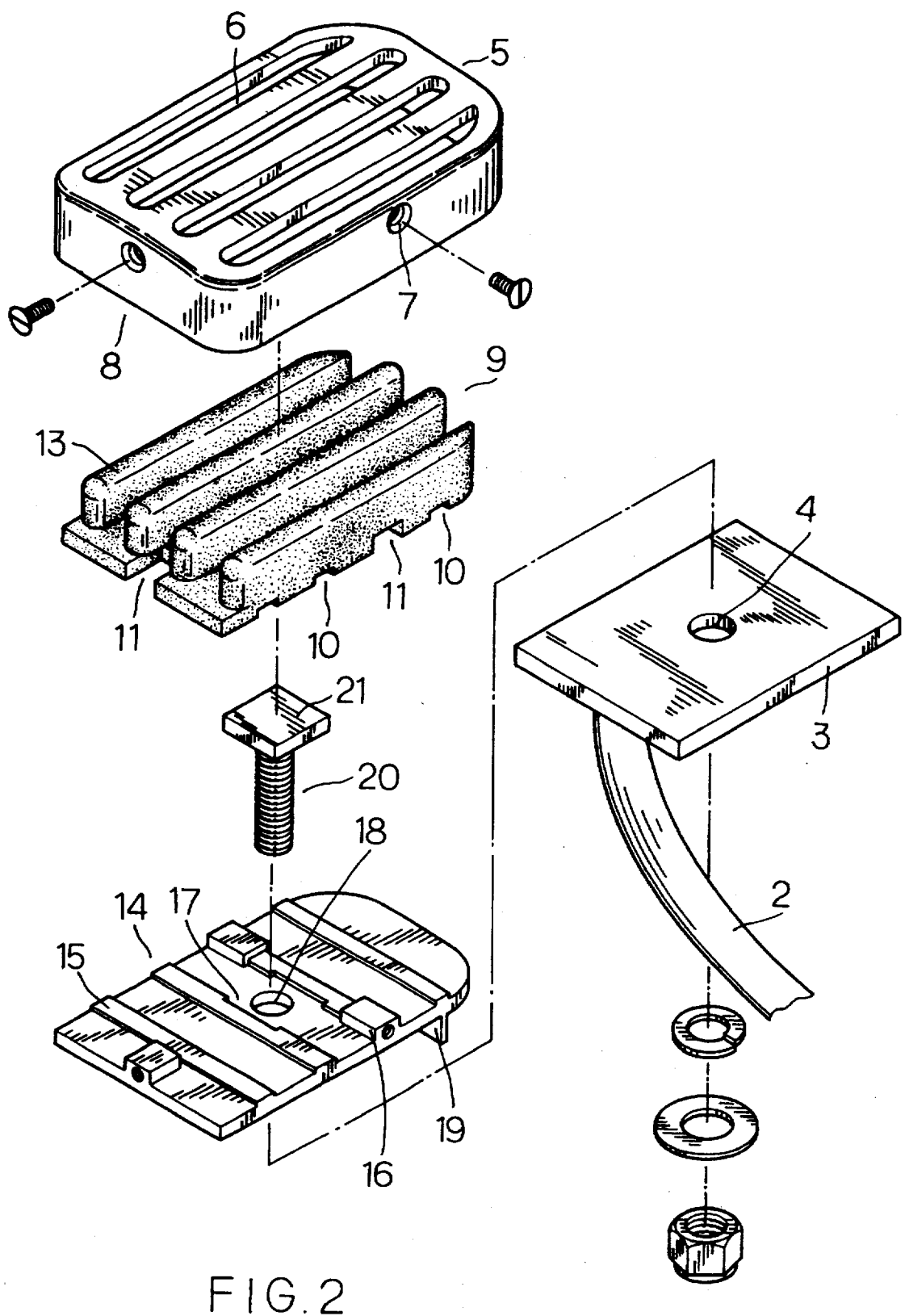
FIG. 2 shows an exploded view of a motorcycle brake pedal of a first preferred embodiment of the present invention.
Figure 3:
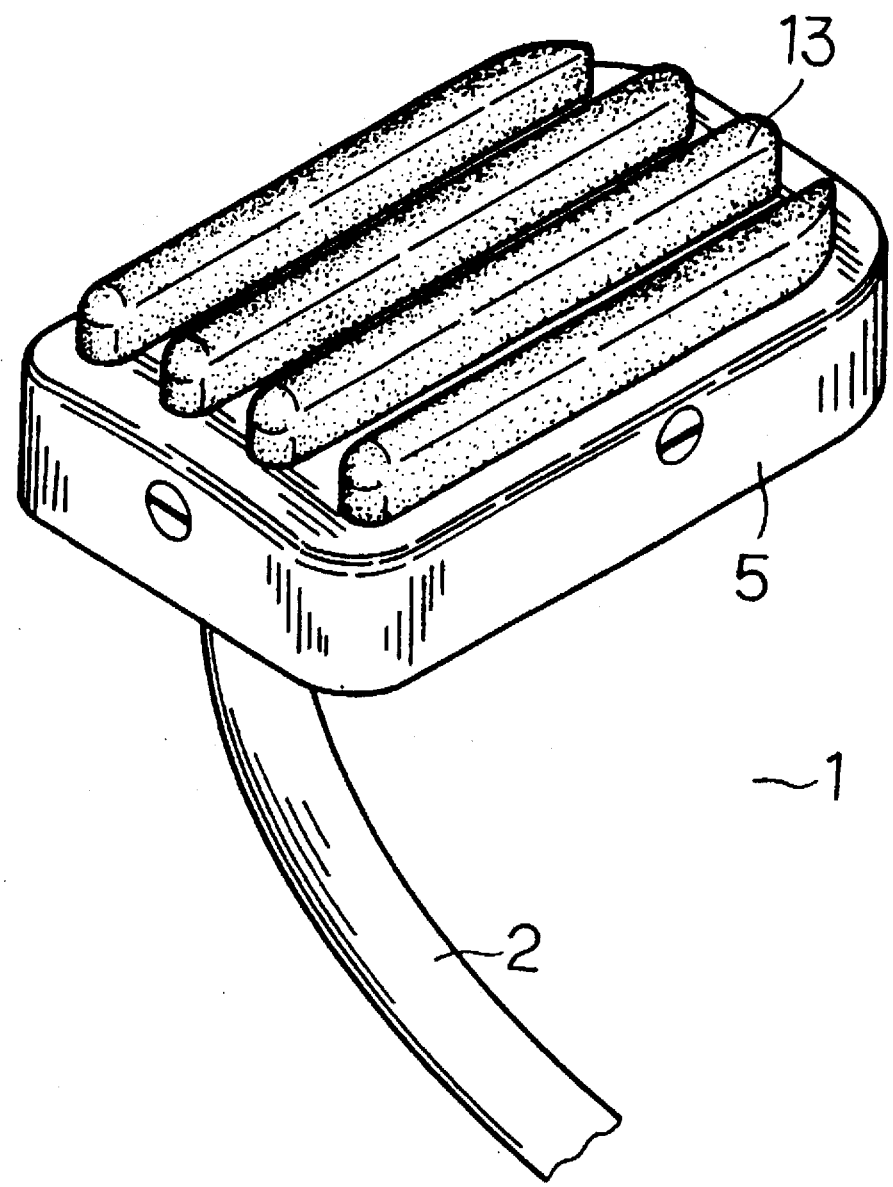
FIG. 3 shows a perspective view of the motorcycle brake pedal in combination according to the first preferred embodiment of the present invention.
Figure 4:
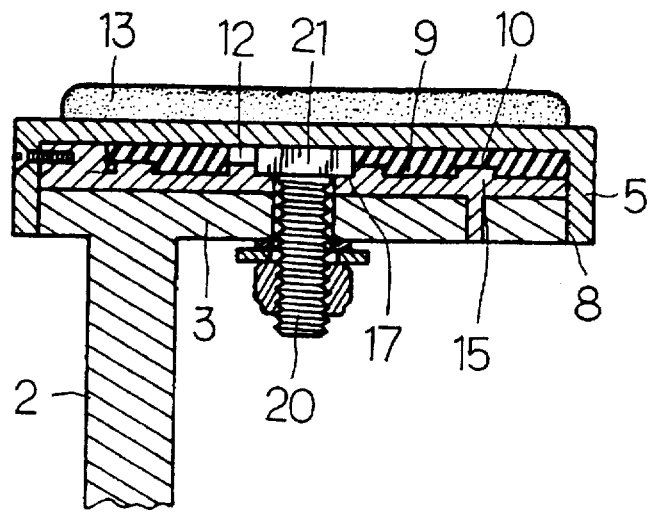
FIG. 4 shows a sectional view of the motorcycle brake pedal as shown in FIG. 3.

As shown in FIGS. 2–4, a motorcycle rear wheel brake pedal 1 of the first preferred embodiment of the present invention comprises a brake tread rod 2, a tread plate 5, a tread plate base 9, a fastening plate 14, and a fastening element 20.

The brake tread rod 2 is fastened at a bottom end thereof with a brake mounting base (not shown in the drawings) of a motorcycle frame and is provided at a top end thereof with a pedal seat 3 which is fastened securely thereto and is in turn provided with a through hole 4.

The tread plate 5 is of a rectangular boxlike construction and is devoid of the bottom wall. The tread plate 5 has an upper wall provided with a plurality of elongated through holes 6 arranged equidistantly. The tread plate 5 is provided with a receiving space 8 which is defined by the upper wall and the side walls. The tread plate 5 is provided respectively in the side walls thereof with a threaded hole 7.

The tread plate base 9 is made integrally of a soft and elastic material, such as rubber. The tread plate base 9 has an underside provided with a plurality of locating slots 10, threaded cuts 11 and 1 recess 12. The tread plate base 9 is further provided on the upper surface thereof with a plurality of skidproof elongate ribs 13 which are made integrally therewith and are corresponding in location and number to the elongate through holes 6 of the tread plate 5. The tread plate base 9 is fitted into the receiving space 8 of the tread plate 5 such that the skidproof elongate ribs 13 of the thread plate base 9 are received in and jutted out of the elongated through holes 6 of the tread plate 5 for providing the tread plate 5 with a skidproof surface. The tread plate base 9 is held securely in the receiving space 8 of the tread plate 5 by means of a plurality of screws engaging the threaded holes 7 of the tread plate 5 and the threaded cuts 11 of the tread plate base 9.

The fastening plate 14 is corresponding in size and shape to the tread plate base 9 and is provided on the upper surface thereof with a plurality of locating ribs 15, which are so located and dimensioned to be received securely in the locating slots 10 of the tread plate base 9. The fastening plate 14 is further provided on the upper surface thereof with a plurality of threaded hole seats 16 corresponding in location to the threaded holes 7 of the tread plate 5. The fastening plate 14 is still further provided in the center of the upper surface thereof with a recessed portion 17 having a through hole 18. The fastening plate 14 has an underside provided with an arresting edge 19 corresponding in width to the pedal seat 3.

The fastening element 20 is a screw having a location head 21, which is fitted into the recessed portion 17 of the fastening plate 14 and the recess 12 of the tread plate base 9. The body portion of the fastening element 20 is received in the through hole 18 of the fastening plate 14 and the through hole 4 of the pedal seat 3. The skidproof ribs 13 of the present invention are made of a soft rubber material and are therefore capable of affording a motorcycle operator a treading comfort. In addition, when the skidproof ribs 13 are damaged or deformed, the tread plate base 9 can be easily replaced with a new one, without having to replace the entire brake pedal 1.

Figure 5:
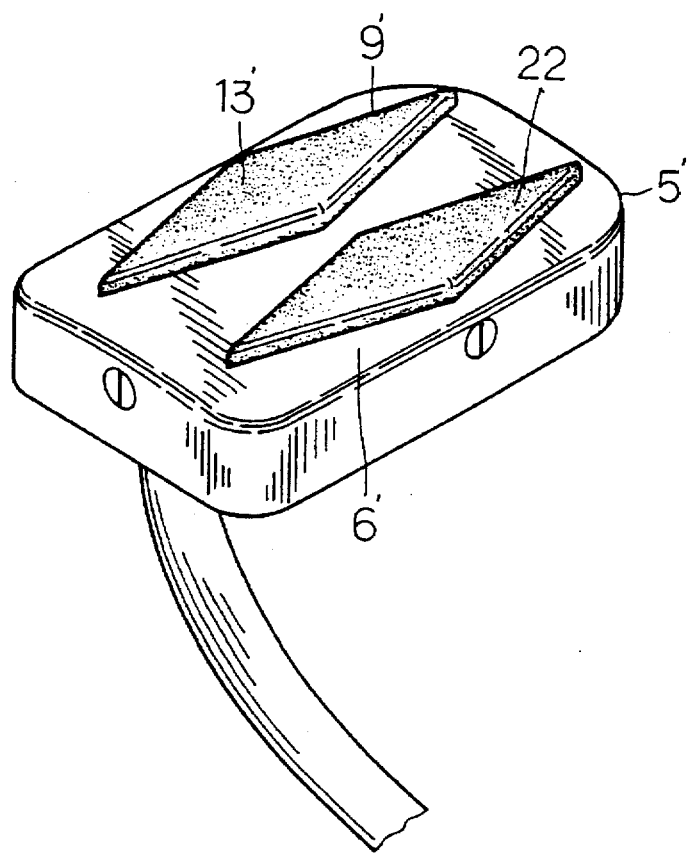
FIG. 5 shows a perspective view of a motorcycle brake pedal of a second preferred embodiment of the preset invention.

The embodiment of the present invention described above is to be regarded in all respects as being merely illustrative and not restrictive. Accordingly, the present invention may be embodied in other specific forms without deviating from the spirit thereof. For example, the present invention may be modified such that the skidproof ribs 13' of the tread plate base 9' and the through holes 6' of the tread plate 5' may be of any geometric shape, such as a diamond 22, as shown in FIG. 5. The present invention is therefore to be limited only by the scopes of the following appended claims.

What is claimed is:

1. A motorcycle rear wheel brake pedal, which comprises:

a brake tread rod fastened at one end thereof with a brake mounting seat of a motorcycle frame and provided at another end thereof with a pedal seat fastened thereto and provided with a through hole; a tread plate having an underside with four side walls attached thereto to form and define a receiving space, said tread plate provided with a plurality of elongate through holes, said side walls provided respectively with at least one threaded hole engageable with a fastening screw;

a tread plate base having an underside provided with a plurality of locating slots, threaded cuts, and a recess, said tread plate base further having an upper side provided with a plurality of skidproof elongate ribs corresponding in location, shape and number to said elongated through holes of said tread plate, said tread plate base being fitted into said receiving space of said tread plate such that said skidproof elongated ribs of said tread plate base are received in and jutted out of said elongated through holes of said tread plate for providing said tread plate with a skidproof surface, and that said tread plate base is held securely in said receiving space of said tread plate by a plurality of said fastening screws engagealbe with said threaded hole of each of said side walls of said tread plate and with said threaded cuts of said tread plate base;

a fastening plate corresponding in size and shape to said tread plate base and provided on an upper surface thereof with a plurality of locating ribs capable of being received in said locating slots of said tread plate base, said fastening plate further provided on an upper surface thereof with a plurality of threaded hole seats corresponding in location to said threaded holes of said tread plate, said fastening plate further provided in said upper surface thereof with a recessed portion having a through hole, said fastening plate having an underside provided with an arresting edge fastened thereto; and a fastening element having a locating head and a body fastened with said locating head which is fitted into said recessed portion of said fastening plate and said recess of said tread pleat base, said body of said fastening element being received in said through hole of said fastening plate and said through hole of said pedal seat.

2. The motorcycle rear wheel brake pedal as defined in claim 1, wherein said tread plate base is made of a rubber material.

3. The motorcycle rear wheel brake pedal as defined in claim 1, wherein said elongate ribs of said tread plate base are made integrally with said tread plate base.

4. The motorcycle rear wheel brake pedal as defined in claim 1, wherein said elongate through holes of said tread plate and said skidproof elongate ribs of said tread plate base are of any geometric shape.

* * * * *